United States Patent Office 3,259,843
Patented July 5, 1966

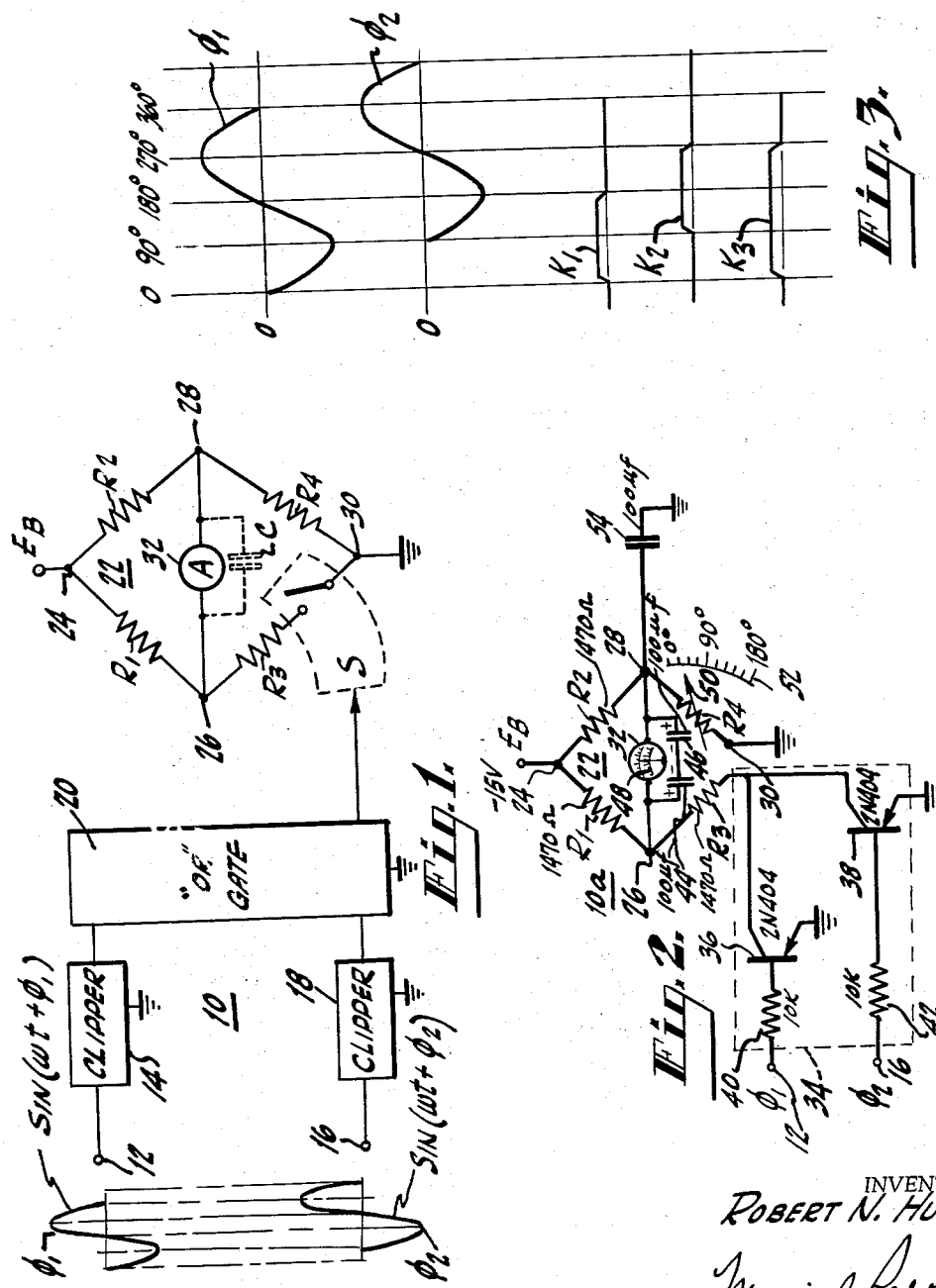

3,259,843
FREQUENCY INSENSITIVE PHASE MEASURING BY AVERAGING THE IMBALANCE OF A WHEATSTONE BRIDGE
Robert N. Hurst, Haddonfield, N.J., assignor to Radio Corporation of America, a corporation of Delaware
Filed Sept. 27, 1963, Ser. No. 312,067
5 Claims. (Cl. 324—83)

This invention relates generally to circuits for measuring the phase angle between two periodic signals, and more particularly to a novel phase-measuring circuit employing logic elements rather than reactive elements. The phase-measuring circuit of the present invention is particularly useful for monitoring the phase angle between two signals of the same frequency. The invention is especially useful where a definite phase relationship between them is to be maintained to operate certain apparatus properly.

In order to operate a two-phase motor at a constant speed, as is desirable in some tape recorders, it is necessary for the phase angle between two sine waves applied to the motor to be in quadrature, that is, 90° apart in phase. Since, in some two-phase motors, the frequency of the input sine waves is 60 cycles per second for a speed of 15 inches per second and 30 cycles per second for a speed of 7½ inches per second, a circuit for monitoring the quadrature of the sine waves should be insensitive to their frequency. It has been proposed to provide circuits that employ reactive elements, such as inductors and capacitors, for measuring the difference in phase between two periodic signals, but such prior art circuits are suitable for an optimum frequency only. Many of these prior art phase-measuring circuits also employ relatively expensive oscilloscopes to indicate the phase relationship between two periodic signals.

It is an object of the present invention to provide an improved phase-measuring circuit that employs logic elements rather than reactive elements.

Another object of the present invention is to provide an improved phase-measuring circuit that is independent of the frequency of the signals, as long as the signals have the same frequency or vary in frequency in the same manner.

Still another object of the present invention is to provide an improved phase-measuring circuit having a direct read-out from a relatively inexpensive meter.

A further object of the present invention is to provide an improved phase-measuring circuit that is affected less by waveform anomalies than are prior art phase-measuring circuits.

Still a further object of the present invention is to provide an improved phase-measuring circuit that is relatively simple in structure, easy to manufacture and operate, and yet highly efficient in use.

Briefly stated, the improved phase-measuring circuit of the present invention comprises means to clip each of two input signals separately and to gate the clipped signals so as to provide an output signal whose duty cycle is a function of the phase relationship between the two input signals. The output signal is applied to one of the impedance arms of a Wheatstone bridge to modify its value of impedance by a switching action whereby its effective impedance is a function of the duty cycle of the output signal. The bridge is balanced only when the effective value of impedance of this arm is equal to the value of impedance of an opposite arm, assuming that the other two opposite arms of the bridge have impedance values equal to each other. The impedance values of the bridge arms may be chosen so that a null is obtained for a predetermined phase angle between the two input signals, or the bridge may be balanced for zero phase angle, and any change in the phase angle may be read on a previously calibrated bridge meter. If desired, one of the arms of the bridge may be variable and a scale may be associated with the variable arm to indicate the phase angle between the two signals when the bridge is balanced. A pair of transistors whose emitter-collector paths are connected in parallel with each other and in series with the first-mentioned arm of the Wheatstone bridge may be used as the "OR" gate circuit and are especially effective in performing the aforementioned functions of clipping, gating, and switching.

The novel features of the present invention, both as to organization and method of operation, as well as additional objects and advantages thereof, will be more readily understood from the following description, when read in connection with the accompanying drawings, in which similar reference characters designate similar parts throughout, and in which:

FIG. 1 is a schematic diagram, partly in block form, to explain the theory of operation of a phase-measuring circuit in accordance with the present invention;

FIG. 2 is a schematic diagram of an embodiment of the phase-measuring circuit of FIG. 1, showing details for the blocks of FIG. 1; and FIG. 3 is a diagram of waveforms used to illustrate the operation of the phase-measuring circuit shown in FIGS. 1 and 2.

Referring, now, more particularly to FIG. 1 of the drawings, there is shown a phase-measuring circuit 10 for measuring the phase angle between two periodic signals $\phi_1$ and $\phi_2$. The signals $\phi_1$ and $\phi_2$ are illustrated herein as sine waves of the same frequency with a phase angle of 90° between them. The phase-measuring circuit 10 is adapted to measure the phase angle between any two signals as long as these signals have the same frequency, even though that frequency may vary.

Separate means are provided to clip each of the signals $\phi_1$ and $\phi_2$. To this end, the signal $\phi_1$ is applied between an input terminal 12 and a common terminal, such as ground, of a clipper circuit 14. The signal $\phi_2$ is applied between an input terminal 16 and the common terminal of a clipper circuit 18. The negative-going portions of the signals $\phi_1$ and $\phi_2$ are clipped by the clipper circuits 14 and 18 to provide, at their outputs, square waves which, in turn, are applied to the inputs of an OR gate circuit 20. The output of the OR gate circuit 20 is applied to an electronic switch, shown in FIG. 1 as a mechanical switch S (to illustrate the theory of operation of the circuit 10) that is connected in series with an arm R3 of a Wheatstone bridge 22.

The Wheatstone bridge 22 comprises an arm R1 connected between terminals 24 and 26, an arm R2 connected between the terminal 24 and a terminal 28, an arm R4 connected between the terminal 28 and a terminal 30, and the series circuit comprising the arm R3 and the switch S connected between the terminal 26 and the terminal 30, the terminal 30 being connected to the common terminal, ground. The arms R1, R2, R3 and R4 are impedance elements, such as resistors, the arm R1 having an impedance value equal to that of the arm R2.

A source of voltage $E_B$ is applied between the pair of opposite (that is, diagonal) terminals 24 and 30 of the Wheatstone bridge 22. Sensitive voltage sensing means, such as a meter 32 of the zero-center micro-ammeter type, is connected as a sensing means between the other pair of opposite terminals 26 and 28 of the bridge 22, and a damping capacitor C is connected across the meter 32.

The operation of the circuit 10 will now be described with the aid of the waveforms illustrated in FIG. 3. The signals $\phi_1$ and $\phi_2$ are applied to the inputs of the clipper circuits 14 and 18. The outputs of the clipper circuits 14 and 18, that is, the inputs to the OR gate circuit 20, are square waves $K_1$ and $K_2$, respectively, as shown in FIG. 3. The output from the OR gate 20 is a square wave $K_3$ whose duty cycle is a function of the phase angle between the input signals $\phi_1$ and $\phi_2$. Where, for example, the phase angle between the signals $\phi_1$ and $\phi_2$ is 90°, the duty cycle of the square-wave output from the OR gate circuit is 75%, as illustrated by the waveform $K_3$ in FIG. 3. The square wave $K_3$ is applied to the switch S to actuate the latter, assuming that the switch S is electronic in operation. Thus, the arm R3 is gated "on" and "off" by the switch S, the latter being effectively closed 75% of the time and open 25% of the time by the 75% duty cycle of the square wave $K_3$. The effective value of impedance of the arm R3 is modified by this switching action so that the Wheatstone bridge 22 can be balanced only when the effective value of impedance of the arm R3 is equal to the value of impedance of the arm R4, assuming, in this example, that the opposite arms R1 and R2 have the same impedance value.

To null the bridge 22 for the quadrature input of the signals $\phi_1$ and $\phi_2$, the impedance of the arm R3 should equal ¾ of the impedance of the arm R4. If, for example, the arm R3 has a resistance of 1470 ohms, the arm R4 should have a value of 4/3×1,470, or 1,960 ohms. Since the current flowing through the arm R3 is pulsating, the capacitor C functions to damp the pulsations. At many frequencies, the natural inertia of the meter 32 will provide adequate damping, the capacitor C being necessary only for very low frequencies.

In general, the equation $$R3 = \Delta R4(R1)/R2$$

should be satisfied to obtain a null reading on the meter 32, where $\Delta$ is the duty cycle of the square-wave output from the OR gate circuit 20, and $$\Delta = 180 + \phi/360$$

where $\phi$ is the phase angle between the two input signals $\phi_1$ and $\phi_2$.

From the foregoing explanation, it is apparent that it is possible to cause the bridge 22 to null at any phase angle relationship between the signals $\phi_1$ and $\phi_2$ by selecting resistors of appropriate values for the arms R1, R2, R3 and R4. Hence, the circuit 10 can be used to monitor the phase angle between two similar signals. If the bridge 22 is balanced for 0° phase angle, any change in the phase angle between the two signals may be observed directly on the meter 22, the latter being calibrated first by signals with known phase angles between them. The accuracy of the circuit 10 is not affected adversely by the amplitudes of the input signals $\phi_1$ and $\phi_2$ as long as their amplitudes are large enough for the clipper circuits 14 and 18 to function properly. However, signals having a large amplitude are preferred.

Referring, now, to FIG. 2 of the drawing, there is shown a phase-measuring circuit 10a that is a practical embodiment of the phase-measuring circuit 10 illustrated partially in block diagram form in FIG. 1. The clipper circuits 14 and 18, the OR gate circuit 20, and the switch S, illustrated in block form in FIG. 1, are included in the logic circuitry within the dashed rectangle 34 of FIG. 2. The clipper circuits 14 and 18 of FIG. 1 are represented by transistors 36 and 38 in FIG. 2. The emitters of the transistors 36 and 38 are connected to the common terminal, ground, and the collectors of the transistors are connected to each other and to the arm R3. Thus, the emitter-collector paths of the transistors 36 and 38 are connected in parallel with each other and in a series circuit with the arm R3, between the bridge terminals 26 and 30.

Resistors 40 and 42 are connected between the input terminals 12 and 16 and the bases of the transistors 36 and 38, respectively. The resistors 40 and 42 limit the signal currents applied to the transistors 36 and 38, thereby aiding in determining the clipping level. Transistors 36 and 38, with their parallel connected emitter-collector paths also function as a gate circuit and as an electronic switching circuit, performing the functions similar to those described for the gate circuit 20 and the switch S in FIG. 1.

The damping of the meter 32 is preferably by means of electrolytic capacitors 44 and 46, as shown in FIG. 2. The capacitors 44 and 46 are connected in series with each other, oppositely polarized, and in parallel with the meter 32 because of the possible reversal of potential across the zero-center meter 32. The meter 32 may be calibrated to indicate the phase angle between the input signals $\phi_1$ and $\phi_2$ on a scale 48.

The arm R4, in FIG. 2, is illustrated as a variable resistor having a dial 50 (illustrated schematically by an arrow) associated with a scale 52 calibrated in degrees to indicate the phase angle between the input signals $\phi_1$ and $\phi_2$. A capacitor 54 is connected between the terminal 28 and the common terminal, or ground, to provide the current peaks required by the electrolytic capacitors 44 and 46.

The operation of the circuit 10a of FIG. 2 is substantially similar to that described for the circuit 10 of FIG. 1. For example, the phase angle between the signals $\phi_1$ and $\phi_2$ may be indicated directly on the scale 52 by applying the signals $\phi_1$ between the input terminal 12 and ground and by applying the signal $\phi_2$ between the input terminal 16 and ground. If, for example, the phase angle between signals $\phi_1$ and $\phi_2$ is zero, and if the impedance of the arm R1 equals the impedance of the arm R2, and the impedance of the arm R3 equals the impedance of the arm R4, when the dial 50 points to 0° on the scale 52, the meter 32 indicates a null. If the phase angle between signals $\phi_1$ and $\phi_2$ were 90°, as shown in FIG. 3, the duty cycle of the square wave $K_3$ (FIG. 3) at the combined output of the collectors of the transistors 36 and 38 would be 75%. Thus, the effective conductance of the arm R3 is ¾ of its maximum value, that is, the effective impedance of the arm R3 is 4/3 of the value of the impedance arm R3 when the latter is switched on with a 100% duty cycle signal. The bridge 22 may now be balanced by rotating the dial 50 until the meter 32 indicates a null. The dial 50 would now indicate 90° on the scale 52, the scale 52 having been previously calibrated with known signals of known phase angle differences between them. If, for example, the signals $\phi_1$ and $\phi_2$ were 180° out of phase with each other, the duty cycle of the square wave at the output of the combined collectors of the transistors 36 and 38 would be 100%. Under these conditions, the impedance of the arm R3 would be switched on at all times and the bridge 22 could be balanced by adjusting the distance of the impedance arm R4 in the bridge circuit to equal that of the arm R3. Under the latter conditions, the dial 50 would be moved to the 180° mark on the calibrated scale 52.

From the foregoing description, it will be apparent that there has been provided an improved circuit for measuring the phase angle between two similar signals of the same frequency. Since logic elements, such as transistors, are used instead of reactive elements, such as inductors and capacitors, for measuring differences in phase relationships, the circuit of the present invention is substantially independent of the frequency and waveform anomalies of the signals whose difference in phase it is desired to measure. Also, the phase angle indicating means may be a relatively inexpensive meter or a variable resistor and an associated, calibrated scale. The values of the circuit components indicated in FIG. 2 refer to merely one embodiment of the invention. However, while only one example of the phase-measuring circuit of the present invention has been described herein, variations in its circuitry and applications, all coming within the spirit of this invention will, no doubt, readily suggest themselves to those skilled in the art. Hence, it is desired that the foregoing shall be considered as illustrative and not in a limiting sense.

What is claimed is:

1. A phase-measuring circuit comprising, in combination,
   (a) a Wheatstone brdge having four terminals and four resistors,
   (b) a first resistor of said four resistors being connected between a first terminal and a second terminal of said four terminals,
   (c) a second resistor of said four resistors being connected between said second terminal and a third terminal of said four terminals,
   (d) a third resistor of said four resistors being connected between said third terminal and a fourth terminal of said four terminals,
   (e) a pair of transistors each having a base and an emitter-collector path,
   (f) means connecting said emitter-collector paths in parallel with each other and in a series circuit with a fourth resistor of said four resistors, said series circuit being connected between said first terminal and said fourth terminal,
   (g) means to connect a source of operating potential between said second and said fourth terminals,
   (h) means to apply to said bases of said transistors, respectively, signals whose phase difference is to be sensed, and
   (i) sensing means connected between said first and said third terminals.

2. A phase-measuring circuit comprising, in combination,
   (a) a Wheatstone bridge having four terminals and four resistors,
   (b) a first resistor of said four resistors being connected between a first terminal and a second terminal of said four terminals,
   (c) a second resistor of said four resistors being connected between said second terminal and a third terminal of said four terminals,
   (d) a third resistor of said four resistors being connected between said third terminal and a fourth terminal of said four terminals,
   (e) a pair of transistors each having a base and an emitter-collector path,
   (f) means connecting said emitter-collector paths in parallel with each other and in a series circuit with a fourth resistor of said four resistors, said series circuit being connected between said first terminal and said fourth terminal,
   (g) means to connect a source of operating potential between said second and said fourth terminals,
   (h) means to apply to said bases of said transistors signals whose phase difference is to be indicated,
   (i) indicating means connected between said first and said third terminals,
   (j) capacitive means connected in series with each other and across said indicating means, and
   (k) capacitive means connected between said third and said fourth terminals.

3. A phase-measuring circuit comprising, in combination,
   (a) a Wheatstone bridge having four terminals and four resistors,
   (b) a first resistor of said four resistors being connected between a first terminal and a second terminal of said four terminals,
   (c) a second resistor of said four resistors being connected between said second terminal and a third terminal of said four terminals,
   (d) a third resistor of said four resistors being connected between said third terminal and a fourth terminal of said four terminals,
   (e) a pair of transistors each having a base and an emitter-collector path,
   (f) means connecting said emitter-collector paths in parallel with each other and in a series circuit with a fourth resistor of said four resistors, said series circuit being connected between said first terminal and said fourth terminal,
   (g) means to connect a source of operating potential between said second and said fourth terminals,
   (h) means to apply to said bases of said transistors signals whose phase difference is to be indicated,
   (i) indicating means connected between said first and said third terminals,
   (j) a pair of electrolytic capacitors connected in series series with each other and across said indicating means,
   (k) a capacitor connected between said third and said fourth terminals,
   (l) means to vary the resistance of one of said four resistors, and
   (m) a scale coupled with said variable resistor to indicate the resistance thereof and thereby to indicate said phase difference.

4. A phase-measuring circuit for measuring the phase relationship between two signals, said circuit comprising, in combination,
   (a) a Wheatstone bridge having four terminals and four resistors,
   (b) a first resistor of said four resistors being connected between a first terminal and a second terminal of said four terminals,
   (c) a second resistor of said four resistors being connected between said second terminal and a third terminal of said four terminals,
   (d) a third resistor of said four resistors being connected between said third terminal and a fourth terminal of said four terminals,
   (e) an OR gate circuit having two inputs and a pair of output terminals,
   (f) means to connect a source of operating potential between said second and said fourth terminals,
   (g) means to apply said two signals respectively to separate ones of said inputs,
   (h) means to connect said two output terminals in a series circuit with a fourth resistor of said four resistors, said series circuit being connected between said first and said fourth terminals, and
   (i) indicating means connected between said first and and said third terminals to indicate said phase relationship.

5. A phase-measuring circuit for measuring the phase relationship between two signals, said circuit comprising, in combination
   a Wheatstone bridge having four terminals and four resistors,
   a first resistor of said four resistors being connected between a first terminal and a second terminal of said four terminals,
   a second resistor of said four resistors being connected between said second terminal and a third terminal of said four terminals,
   a third resistor of said four resistors being connected between said third terminal and a fourth terminal of said four terminals, a pair of voltage clipping means, an OR circuit having two inputs and a pair of output terminals, means to apply said two signals respectively to separate ones of said inputs through respective ones of said clipper means, means to connect said two output terminals in a series circuit with a fourth resistor of said four resistors, said series circuit being connected between said first and said fourth terminals, indicating means connected between said first and third terminals to indicate said phase relationship, and means to connect a source of operating potential between said second and said fourth terminal.

References Cited by the Examiner

UNITED STATES PATENTS

| | | | |
|---|---|---|---|
| 3,016,517 | 1/1962 | Saltzberg | 324—83 X |
| 3,155,350 | 11/1964 | Campbell | 324—83 X |

WALTER L. CARLSON, *Primary Examiner.*

RICHARD B. WILKINSON, *Examiner.*

P. F. WILLE, *Assistant Examiner.*